(12) United States Patent
Fribus et al.

(10) Patent No.: US 11,954,261 B2
(45) Date of Patent: Apr. 9, 2024

(54) SWIPE GESTURE DETECTION DEVICE AND METHOD FOR DETERMINING A SWIPE GESTURE PERFORMED ON A MOVING SURFACE ELEMENT OF A VEHICLE COMPONENT

(71) Applicant: ZF Friedrichshafen AG, Friedrichshafen (DE)

(72) Inventors: Vitali Fribus, Quakenbrück (DE); Nico Ruess, Meckenbeuren (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 214 days.

(21) Appl. No.: 17/598,068

(22) PCT Filed: Mar. 24, 2020

(86) PCT No.: PCT/EP2020/058078
§ 371 (c)(1),
(2) Date: Sep. 24, 2021

(87) PCT Pub. No.: WO2020/193509
PCT Pub. Date: Oct. 1, 2020

(65) Prior Publication Data
US 2022/0187924 A1   Jun. 16, 2022

(30) Foreign Application Priority Data

Mar. 25, 2019 (DE) ..................... 10 2019 204 060.8

(51) Int. Cl.
*G06F 3/01* (2006.01)
*B60K 37/06* (2006.01)
(Continued)

(52) U.S. Cl.
CPC .............. *G06F 3/017* (2013.01); *B60K 37/06* (2013.01); *G06F 3/041* (2013.01);
(Continued)

(58) Field of Classification Search
CPC .............. B60K 37/06; B60K 2370/143; B60K 2370/1468; B60K 2370/1446;
(Continued)

(56) References Cited

U.S. PATENT DOCUMENTS 9,063,627 B2    6/2015  Yairi et al.
10,801,610 B2 * 10/2020  Cha .......................... F16H 59/08
(Continued)

FOREIGN PATENT DOCUMENTS

DE        103 12 338 A1    10/2004
DE   10 2005 038 161 A1     7/2006
(Continued)

OTHER PUBLICATIONS

International Search Report and Written Opinion of the International Search Authority dated Jun. 9, 2020 in International Application No. PCT/EP2020/058078 (English and German languages) (13 pp.).
(Continued)

*Primary Examiner* — Deeprose Subedi
(74) *Attorney, Agent, or Firm* — Crowell & Moring LLP

(57) ABSTRACT

A swipe gesture detection device may determine a swipe gesture performed on a moving surface element of a vehicle component. The swipe gesture detection device includes a spring, which applies a pre-loading between the moving surface element and a housing element of the vehicle component. The swipe gesture detection device also includes a contactless measuring distance sensor having at
(Continued)

least three sensor elements arranged in different positions for detecting a respective distance between the surface element and the housing element.

12 Claims, 16 Drawing Sheets

(51) Int. Cl.
  *G06F 3/041* (2006.01)
  *H01H 13/18* (2006.01)
  *H01H 13/52* (2006.01)

(52) U.S. Cl.
  CPC .......... *H01H 13/186* (2013.01); *H01H 13/52* (2013.01); *B60K 2370/1446* (2019.05); *B60K 2370/1468* (2019.05); *G06F 2203/04105* (2013.01); *G06F 2203/04108* (2013.01); *H01H 2013/525* (2013.01)

(58) Field of Classification Search
  CPC .......... G06F 3/016; G06F 3/041; G06F 3/017; G06F 2203/04105; G06F 2203/04108; H01H 13/52; H01H 13/186; H01H 2013/525; G01L 5/22; G01L 1/005; F16H 59/12
  See application file for complete search history.

(56) References Cited

U.S. PATENT DOCUMENTS

| | | | | |
|---|---|---|---|---|
| 10,907,729 | B2* | 2/2021 | Sage | F16H 59/12 |
| 11,193,580 | B2* | 12/2021 | Eichhorn | F16H 59/12 |
| 11,376,957 | B2* | 7/2022 | Harris | B60K 37/06 |
| 2014/0149909 | A1* | 5/2014 | Montes | B60K 35/00 715/771 |
| 2014/0318295 | A1* | 10/2014 | Kim | F16H 59/08 74/473.12 |
| 2017/0228089 | A1 | 8/2017 | Hoggarth et al. | |
| 2019/0255949 | A1* | 8/2019 | Larin | F16H 59/08 |
| 2020/0103021 | A1* | 4/2020 | Eichhorn | G05G 5/005 |
| 2020/0277923 | A1* | 9/2020 | Dixon | F02D 41/064 |

FOREIGN PATENT DOCUMENTS

| | | |
|---|---|---|
| DE | 10 2008 061 987 A1 | 6/2010 |
| DE | 10 2013 225 463 A1 | 6/2015 |
| DE | 10 2015 200 010 A1 | 7/2016 |

OTHER PUBLICATIONS

Office Action dated Jan. 15, 2020 for German Patent Application No. 10 2019 204 060.8, (14 pp.) note: 1 and 2 are English language Explanations to Section C. Result of Determination Document.

* cited by examiner

SWIPE GESTURE DETECTION DEVICE AND METHOD FOR DETERMINING A SWIPE GESTURE PERFORMED ON A MOVING SURFACE ELEMENT OF A VEHICLE COMPONENT

RELATED APPLICATION(S)

This application is a filing under 35 U.S.C. § 371 of International Patent Application PCT/EP2020/058078, filed Mar. 24, 2020, and claiming priority to German Patent Application DE 10 2019 204 060.8, filed Mar. 25, 2019. All applications listed in this paragraph are hereby incorporated by reference in their entireties.

TECHNICAL FIELD

The present disclosure relates to a swipe gesture detection device and a method for determining a swipe gesture performed on a moving surface element of a vehicle component

BACKGROUND

Surface touch-sensitive input elements (also called touch applications or touchscreens) are presently used in many applications. They are distinguished, for example, by simple handling and a very small installation space. However, one decisive disadvantage is the lack of haptics. The user depends only on visual feedback or acoustic feedback. This requires a high degree of concentration and is therefore not harmless above all for use for safety-critical driving functions in a vehicle, for example the gear level selection, since inadvertent inputs can occur quickly.

BRIEF DESCRIPTION OF THE DRAWINGS

Certain embodiments are explained in more detail by way of example on the basis of the appended drawings. In the figures.

DETAILED DESCRIPTION

Figure 1:
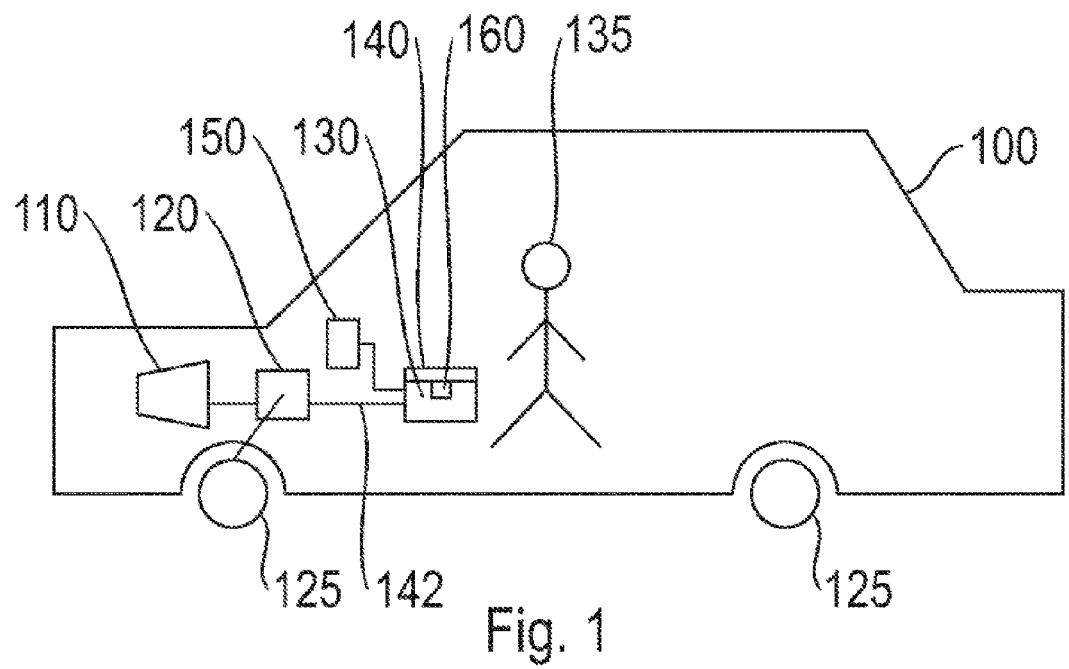
FIG. 1 shows a schematic illustration of a vehicle having a swipe gesture detection device according to one exemplary embodiment.

Against the background discussed above, the present disclosure relates to an improved swipe gesture detection device and an improved method for determining a swipe gesture performed on a moving surface element of a vehicle component The approach presented here presents a swipe gesture detection device for determining a swipe gesture performed on a moving surface element of a vehicle component, wherein the swipe gesture detection device has the following features:

a spring which applies a pre-tension between the moving surface element and a housing element of the vehicle component; a distance sensor, measuring in a contactless manner, having at least two sensor elements arranged at different positions for registering a distance between the surface element and the housing element in each case at the positions of the sensor elements; and an evaluation unit, which is designed to determine the swipe gesture performed on the surface element using a parameter of the spring and the distances registered by the sensor elements between the surface element and the housing element.

A swipe gesture can be understood in the present case as a movement during which, for example, the finger of a user touches the surface element and is also actively guided in a course over the surface element during this touch. Therefore, a force or a pressure is applied during the swipe gesture to a region of the surface element changing over time. A distance sensor can be understood in the present case as a sensor which has multiple sensor elements as partial sensors, which are arranged at different positions and can register in a contactless manner the distance of the surface element to the housing element at the corresponding positions of these partial sensors or sensor elements. For example, such a distance sensor can register the distance capacitively or inductively. An evaluation unit can be understood in the present case as a component in which the corresponding distance values or the spring parameters are processed and the swipe gesture performed on the surface element is determined.

The approach presented here is based on the finding that very precise two-dimensional or multidimensional detection of a movement path of a pressure point on the surface element is possible by the at least two sensor elements of the distance sensor if, for example, a user of the vehicle component presses with a finger on the surface element and at the same time moves this finger in a specific pattern or movement course. It may then also be detected with which force the finger was pressed at the respective position on the surface element by the determination of the distances measured by the sensor elements between the surface element and the housing element and the knowledge of a spring parameter, in particular the spring constant, so that it may be determined very precisely therefrom which movement and/or pressure trajectory the finger has taken during its path over the surface element.

According to one particularly advantageous embodiment, the evaluation unit can be designed to detect a path of a finger over the surface element as a swipe gesture. The evaluation unit can be designed to determine a movement path of the pressure of the finger on the surface element using distances registered by the sensor elements, which have been recorded at different points in time. In particular, the swipe gesture can be detected as such if the path or the movement trajectory is longer than a predefined minimum path and/or to detect the swipe gesture if the finger has been pressed with a force on the surface element which is greater than a minimum force. This minimum force can be, for example, 3 to 10 N or can be formed in such a way that the distance between the surface element and the housing element is reduced by 0.1 to 0.3 mm under the action of the spring at the relevant sensor element. Such an embodiment of the approach proposed here offers the advantage of enabling a very robust and thus low-interference recognition of the swipe gesture, since, for example, inadvertent touches of the surface element can be discarded on the basis of the recognized pressure and/or movement pattern of the path of the finger over the surface element for the actual detection of the swipe gesture.

One embodiment of the approach proposed here is usable in a very technically simple and flexible manner in which the spring is formed as a leaf spring and/or at least has multiple spring wings on different sides of the spring, by means of which it is connected to the housing element and/or the surface element of the vehicle component.

Furthermore, an embodiment of the approach proposed here is advantageous in which the distance sensor is designed as a capacitively and/or inductively measuring sensor, in particular wherein the sensor elements are designed to measure the distance between the surface element and the housing element at the positions of the sensor elements capacitively and/or inductively. Such an embodiment offers the advantage of being able to perform a precise, low-friction, and cost-effective measurement of the distances between the housing element and the surface element at the respective positions of the sensor elements using very technically simple means. At the same time, such a measurement technology is technically mature.

According to a further embodiment of the approach proposed here, the spring can be at least partially formed and/or fastened on the housing element in such a way that it has a different spring stiffness in each of differing, in particular opposite movement directions and/or wherein the spring is designed at least partially as a measurement encoder of the distance sensor. Such an embodiment of the approach proposed here offers the advantage of being able to give feedback about the actuation of the surface element very flexibly to a user of the swipe gesture detection device. The differing spring stiffness can be implemented by a free movement path of the spring or part of the spring of different lengths, which can be moved in the respective movements. For example, a different spring stiffness can act upon pressing down of the surface element than upon release of the surface element. The use of an actuator, which is also described in more detail hereinafter, can furthermore be simplified in this way, since, for example, for an active movement of the surface element effectuated by the actuator, this element experiences a lesser counterforce due to the spring than a finger which presses on the surface element.

An embodiment of the approach proposed here is also conceivable in which the spring at least partially includes a metallic material, in particular includes copper, aluminum, and/or steel. Such an embodiment of the approach proposed here, in particular the selection of the mentioned materials, offers the advantage of enabling, on the one hand, a well settable spring action and also, on the other hand, a precise registration of the distance by the sensor elements of the distance sensor.

Particularly good haptic feedback of a detected swipe gesture to a user of the surface element may be implemented in one embodiment of the approach proposed here in which an actuator is provided, which is mechanically coupled to the surface element and which is designed to move the surface element actively when the swipe gesture has been detected.

A particularly advantageous embodiment of the approach proposed here may be achieved if the actuator is designed to move the surface element at a frequency of 50 to 30 Hz and/or an amplitude or deflection of at most 0.15 mm and/or a damping of a vibration of 5% of a maximum amplitude after 3 cycles and/or an acceleration at the first vibration maximum of up to 6G. Such an embodiment offers the advantage that the actuator can actively activate movements of the surface element in this case which can be received or detected very precisely and sensitively by the (operating) surface element due to physiological properties or the human sense of touch.

An embodiment of the approach proposed here may be produced in a very technically simple manner in which the actuator has at least one coil, which is in particular arranged centrally in relation between the surface element and the housing element. In this way, a movement which is perceptible well haptically can be induced in the entire surface element.

To enable a reliable and precise input of a swipe gesture by operation of the surface element, according to a further embodiment of the approach proposed here, the surface element can at least partially have a relief-shaped contour which a finger of an operator of the vehicle component is to travel along as a swipe gesture. In this way, an orientation of the operator of the surface element can be facilitated, so that the operator can rapidly find a special position on the surface element, which corresponds to a desired function to be set, by a sense of touch even without visual contact on the surface element.

The advantages of the approach proposed here may also be implemented in a further embodiment as a method for determining a swipe gesture performed on a moving surface element of a vehicle component using a variant of a swipe gesture detection device presented here, wherein the method has the following steps:

reading one distance per sensor element between the surface element and the housing element; and determining the swipe gesture performed on the surface element using a parameter of the spring and the distances registered by the sensor elements between the surface element and the housing element.

An evaluation unit can also advantageously be provided which is designed to execute and/or activate the steps of a variant of a method presented here in corresponding units. The mentioned advantages may certainly also be implemented in a very technically simple manner by an evaluation unit.

An evaluation unit can be an electrical device which processes electrical signals, for example sensor signals, and outputs control signals as a function thereof. The evaluation unit can have one or more suitable interfaces, which can be designed to be hardware and/or software. In the case of a hardware design, the interfaces can be, for example, part of an integrated circuit in which functions of the device are implemented. The interfaces can also be separate integrated circuits or can at least partially consist of discrete components. In the case of a software design, the interfaces can be software modules which are provided, for example, on a microcontroller in addition to other software modules.

A computer program product is also advantageous, having program code which can be stored on a machine-readable carrier such as a semiconductor memory, a hard drive memory, or an optical memory and is used to carry out the method according to one of the above-described embodiments when the program is executed on a computer or an evaluation unit.

In the following description of preferred exemplary embodiments of the present invention, identical or similar reference signs are used for the elements shown in the various figures and acting similarly, wherein a repeated description of these elements is omitted.

FIG. 1 shows a schematic illustration of a vehicle 100 in which, for example, a motor 110 provides a drive power at a transmission 120, from which in turn the drive power is transmitted to wheels 125 of the vehicle 100. To be able to select, for example, gear levels associated with different driving velocities, into which the transmission 120 is to be shifted, a gear selection switch is provided as a vehicle component 130 in the present case, for example, via which a vehicle occupant 135 can select a gear selection or a transmission ratio level of the transmission 120. For this purpose, in modern vehicles the vehicle component 130 is designed in such a way that to actuate the vehicle component 130, to select the specific gear selection step here, only a pressure or a movement/swipe gesture with the finger on an (operating) surface element 140 is to be performed, wherein the vehicle component 130 then detects the gear selection intent manually input by the vehicle occupant 135 from this pressure or the movement or swipe gesture and activates the transmission 120 accordingly by means of an activation signal 142.

However, it is also conceivable that the vehicle component 130 shown here is designed for manual input of other control commands, for example for activation of an infotainment system 150 or the like. The function of the vehicle component 130 for a convenient input of an activation command by the vehicle occupant 135 is of particular relevance here. A swipe gesture detection device 160, which is described in more detail hereinafter, is now provided for this function of registering a force or a movement/swipe gesture on the vehicle components 130.

It is to be ensured for this swipe gesture detection device 160 that the least possible friction is caused during the reading of the force on the (operating) surface element 140, so that a force or swipe gesture performed by the vehicle occupant 135 on the operating surface element 140 can be registered with a very quick response by the vehicle component 130 or also a very small force or small swipe gesture is already registered precisely and unambiguously. In conventional systems, in contrast, an approach for force detection is often used which sometimes requires a high force to be applied by the vehicle occupant 135 to the (operating) surface element 140 and therefore has a low level of convenience for the vehicle occupant 135.

To now be able to overcome the above-mentioned disadvantages of a friction-afflicted swipe gesture detection, an improvement of the vehicle component 130 or a swipe gesture detection device 160 is proposed according to the approach proposed here.

Figure 2:
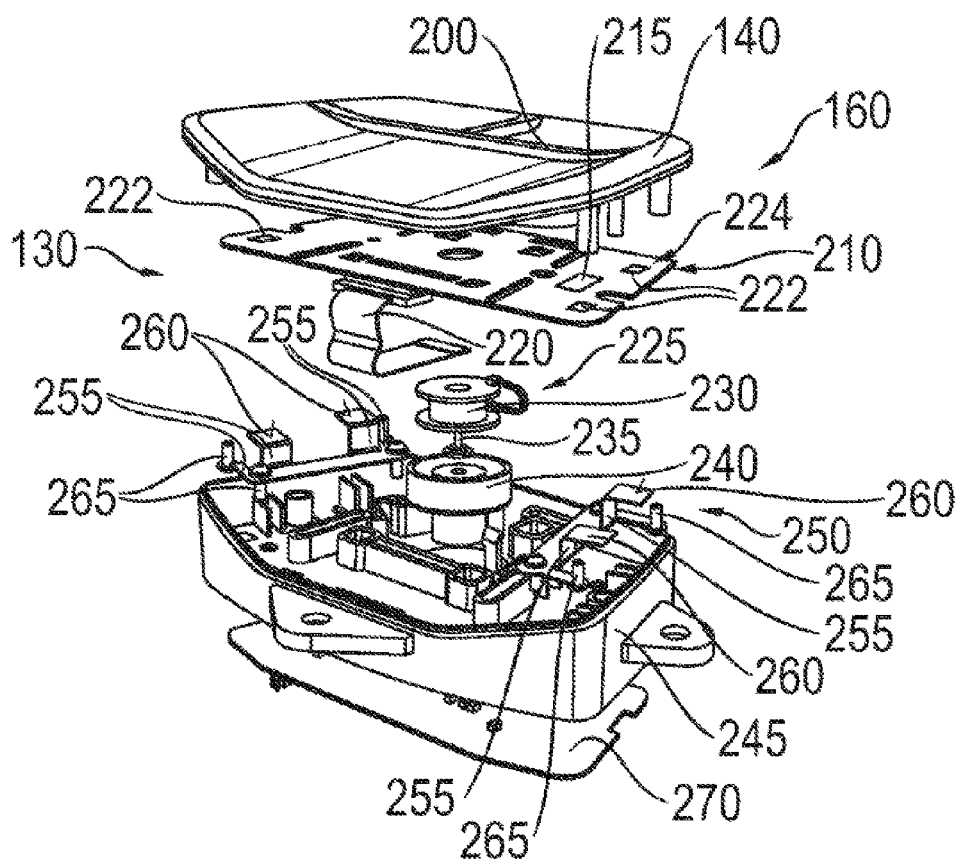
FIG. 2 shows a vehicle component in an exploded illustration.

FIG. 2 shows a vehicle component 130 in an exploded illustration. In this case, (operating) surface element 140, which has contours 200, for example, which can be formed as protrusions for guiding a finger of the user, is illustrated here. Furthermore, the vehicle component has a circuit board of the printed circuit board 210, on which electronic components, for example the evaluation unit 215, are arranged and the lines or external cables 220 embedded for example in the printed circuit board 210 are connected to electronic components which are not arranged or embedded on or in the printed circuit board 210. Furthermore, at least three sensor elements 222 as part of a distance sensor 224 are arranged on the printed circuit board 210, which can detect in a contactless manner a distance between the surface element 140 (which is connected to the printed circuit board 210) and a measurement element arranged underneath, wherein the measurement element will be described in more detail later. Furthermore, an actuator 225 is shown in an exploded illustration in FIG. 2, in which a coil 230 is placed on a fastening dome 235 and the coil 230 and the fastening dome 235 are accommodated in a jacket 240 as a housing and fastened in a housing element 245 of the vehicle component 130. The housing element 245 can, for example, contain plastic material or can be manufactured from this plastic material, for example by means of an injection molding method. Furthermore, a spring 250 is shown in the illustration of the vehicle component 130, which has multiple spring wings 255 explained in more detail above, of which, for example, a part are unwound in the upper end and thus form end faces 260, which can form, for example, as a partial element or measurement element, a counterpart to the respective sensor elements 222 of the distance sensor 224. These end faces 260 can be arranged opposite to the sensor elements 222, for example, and can thus be used as a measurement element for the contactless distance detection of a distance between these end faces 260 and the sensor elements 222. The spring 250 which contains the end faces 260 is screwed here using fasteners, for example fastening screws 265, onto the housing element 245, so that the end faces 260 can be used as a reference for the rigid housing element 245, which is connected, for example, in a fixed or rigid manner to further components of the vehicle 100 from FIG. 1. Furthermore, for example, the evaluation unit 215 can also be connected in an electrically conductive manner to components of a main printed circuit board 270, which then also contains a control unit, for example, to output the activation signal 142 from FIG. 1. In the illustration from FIG. 2, four end faces 260 of the spring 250 of the vehicle component 130 are provided; alternatively, however, only two or three spring elements or end faces 260 of the spring 250 of the vehicle component 130 could also be provided to determine a position of the pressure of the finger on the surface element 140 or a course of the pressure movement of the finger on the surface element 140 and therefrom the swipe gesture.

To now obtain the swipe gesture detection device 160 according to the approach presented here, several of the components shown in FIG. 2 can be used, for example the spring 250, the distance sensor 224 having the sensor elements 222, and the evaluation unit 215.

Figure 3:
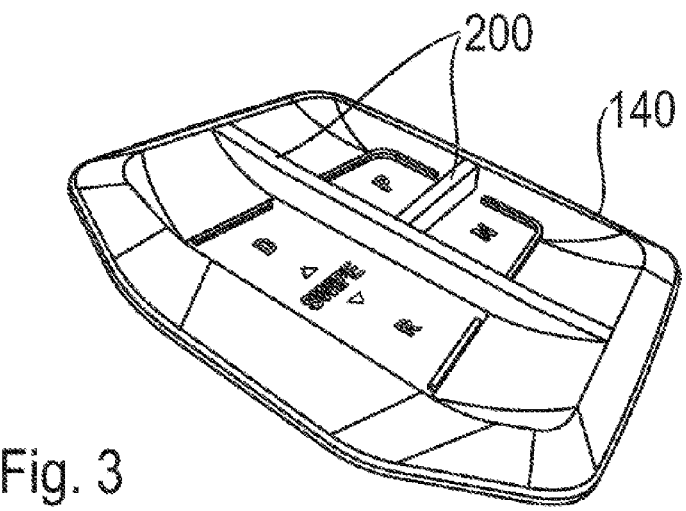
FIG. 3 shows a perspective view of a surface element.

FIG. 3 shows a perspective view of a surface element 140, in which the contours 200 are shown in more detail. As can be seen, the contours 200 divide individual regions of the surface element 140, so that, for example, for the operator of this surface element 140, a haptic guide is also enabled or facilitated by the contours 200, and in this way the operator of this surface element 140 very easily finds the corresponding desired switching position which he can select by a pressure on this region of the surface element 140.

As a specific component requirement for an active haptic system such as the vehicle component 130, it can be stated that the operating surface element 140 is to have a high stiffness (>70 N/mm) to form homogeneous feedback, also at its edge regions. To actuate this (operating) surface element 140, the user or operator can place his finger on a touch-sensitive region (button, slider, or XY pad) on the operating surface element 140. On the example shown here of a Swipetronic switch as a vehicle component 130, this region can represent, for example, the D-R slider or the buttons P or N, as shown in FIG. 3.

To select a touch function (for example touch button), the user or operator is to apply a force to the corresponding position of the surface element 140. On the basis of the example of the Swipetronic as the vehicle component 130 of the applicant, this force can be between 3 N and 10 N depending on the function, so that the surface element 140 or a component connected thereto such as the printed circuit board 210 is pressed down accordingly. This (counter) force to the pressure applied by the finger is partially implemented, for example, by means of the spring 250 including spring wings 255, which are formed here by way of example as leaf springs having end faces 260 and which are arranged opposite to corner regions of the operating surface element 140 or the printed circuit board 210 on which the sensor elements 222 are positioned, but are fixedly screwed on as fixed bearings in relation to the housing element 245. As shown in FIG. 2, for the present example of the vehicle component, a spring having 4 spring wings is provided, which are formed as leaf spring elements. Another part of the (counter) force to the pressure applied by the finger is implemented, for example, by means of the spring 250 including the further spring wings 255, which protrude in the region of the spring 250 on which the fastening screws 265 are attached, as is explained in more detail hereinafter.

Figure 4:
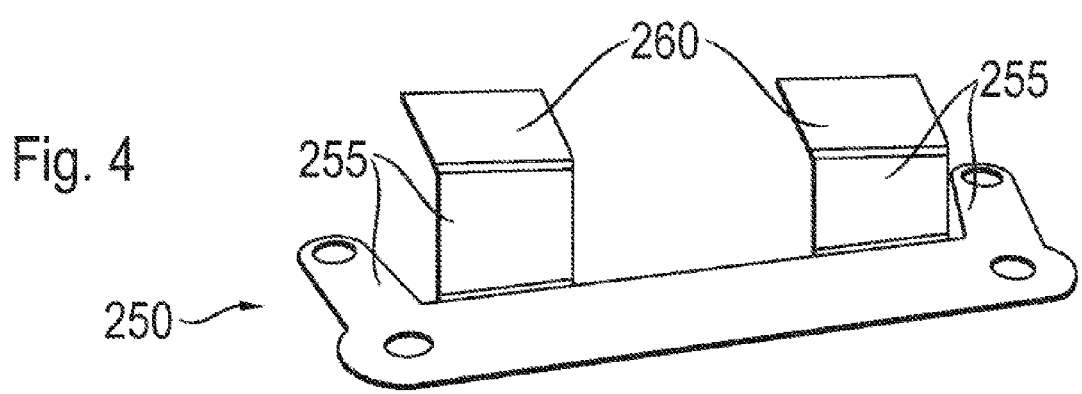
FIG. 4 shows a perspective view of a spring.

FIG. 4 shows a perspective view of such a spring 250, in which spring wings 255 protrude unwound, on the one hand, which then have the end faces 260, which can be arranged opposite to the sensor elements 222 from FIG. 2. On the other hand, the spring 250 has further spring wings 255, for example, which extend away in an edge region from a main body of the spring 250.

Figure 5:
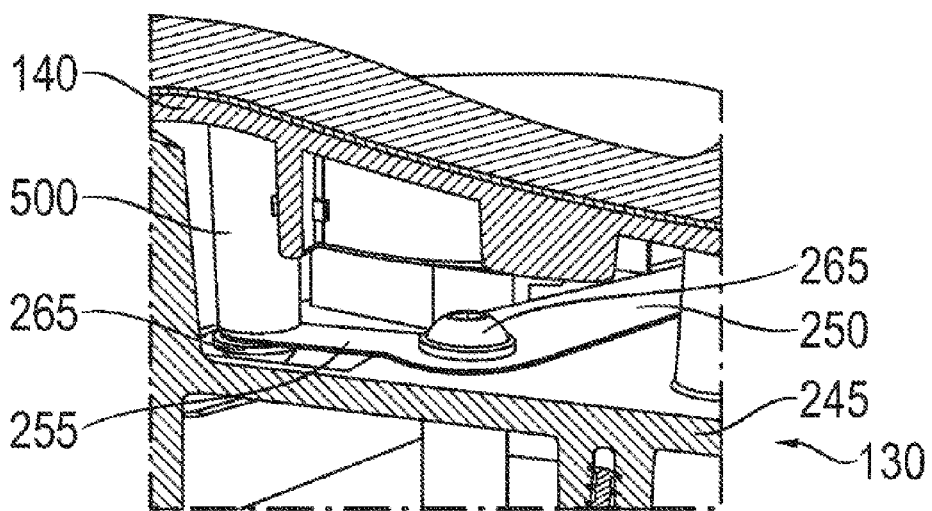
FIG. 5 shows a perspective view of a partial detail of the vehicle component.

FIG. 5 shows a perspective view of a partial detail of the vehicle component 130, in which the spring 250 is fastened using one fastening screw 265 on the housing element 245 and using another fastening screw 265 on a web 500 of the surface element 140 or the printed circuit board 210.

The spring elements or spring wings 255 are designed so that a maximum force trigger threshold is reached after 0.1 to 0.3 mm, so that the operating surface element 140 still seems "rigid" overall to the user and the movement of the operating surface element 140 is not perceived. Furthermore, the system is to have a force sensor system which can sense the force applied by the user to the operating surface. Such a force sensor system can be implemented by the sensor elements 222, which can register a contactless distance reduction of the distance between the sensor elements in relation to the end faces 260 of the spring 250, and using the knowledge of a stiffness of the spring 250, especially the stiffness of the spring wings 255 here, which are fastened using the fastening screws 265 on the surface element 140 and the housing element 245. On the basis of the example of the Swipetronic of the applicant, the user force is implemented by means of an inductive distance measurement, for example, via four coils (which are formed as planar coils, for example), which are located as sensor elements 222 in the corner regions of the touch PCB, thus the printed circuit board 210. The touch PCB or printed circuit board 210 is fastened (for example laminated) using the rear side on the operating surface element 140. The coils of the sensor elements 222 are damped, for example, by means of the end faces 260 of the spring 250 (which is designed here as a leaf spring), which are formed as defined damping surfaces, and which are located in parallel to the coils of the sensor elements 222 at a defined distance (for example 0.5 mm) underneath.

Figure 6:
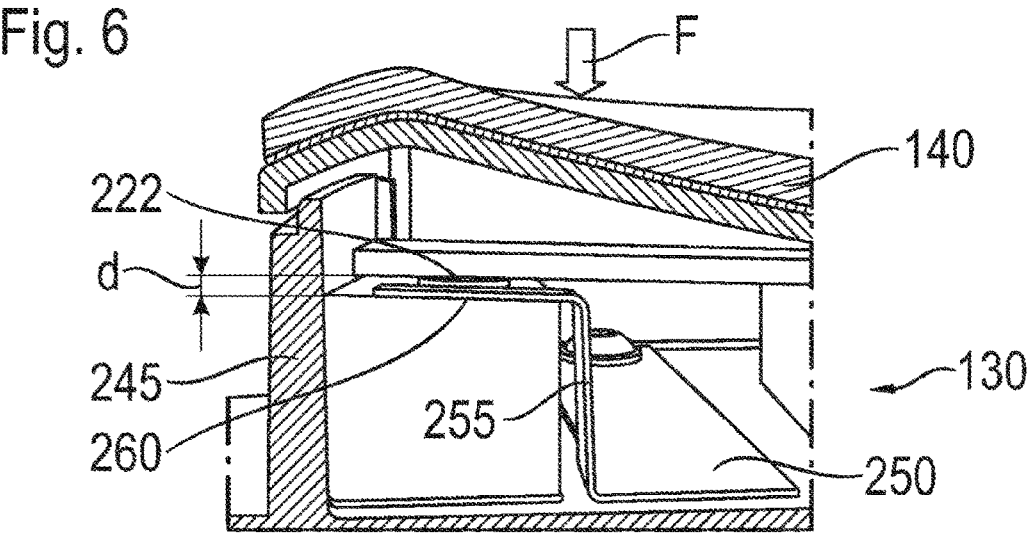
FIG. 6 shows a cross-sectional illustration through a partial region of the vehicle component.

FIG. 6 shows a cross-sectional illustration over a partial region of the vehicle component 130, in which it is shown how the finger force represented by an arrow F is applied to the surface element 140. The distance d between the sensor element 222 and the end face 260 is reduced by pressing down the surface element 214 here, whereby the inductance changes in the region of a sensor element 222 formed as a coil. Alternatively, the sensor element 222 can also be formed as a capacitive sensor, wherein in this case, in the event of a reduction of the distance d, a capacitance between the end face 260 and the sensor element 222 increases. The present distance d can then be inferred very precisely from the change of the capacitance or inductance, wherein an inference of the present force F, which is applied by the finger to the surface element 140, is possible with knowledge of this distance d and the spring stiffness or spring constant of the spring 250 or the spring wings 255 between the housing element 245 and the surface element 140, as are shown, for example, in FIG. 4 or 5.

If the user thus applies a force F to the operating surface element 140 and thus also to the sensor elements 222 opposite to the end faces 260 of the leaf spring 250, it is pressed in the Z direction. The nominal air gap d between the damping surfaces of the end faces 260 of the leaf spring 250 and the opposite inductive coils as sensor elements 222 on the touch PCB or the printed circuit board 210. Since the spring rate of the leaf spring elements or spring wings 255 are known, the force F with which the user presses on the operating surface element 140 can be derived from the path difference d. The material of the leaf spring is to have a good electrical conductivity and a low resistance for this purpose (for example CuZn37 R630), so that a change of the air gap d, which takes place due to the finger pressure with the force F of the user, has sufficiently high damping of the signal.

Figure 7:
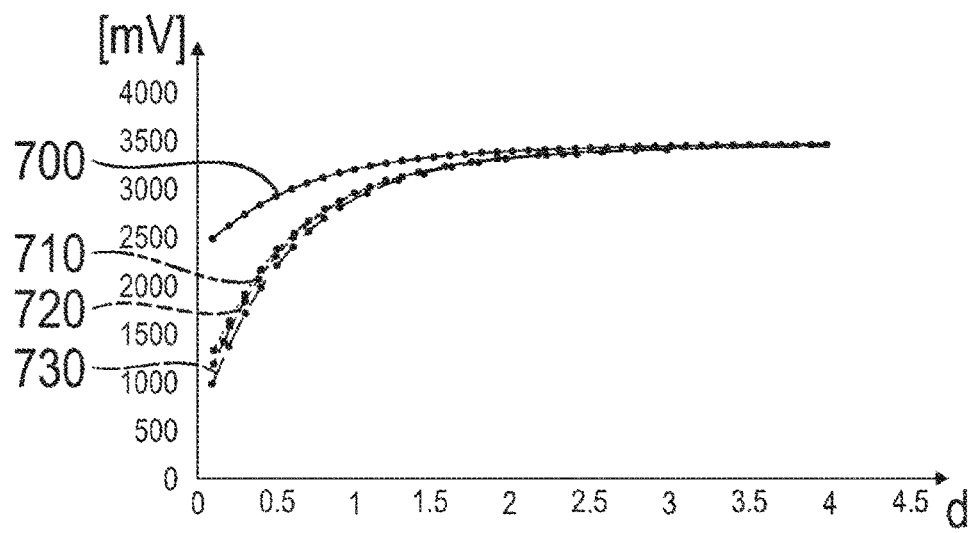
FIG. 7 shows a diagram on which the distance in millimeters according to FIG. 6 is plotted on the abscissa and a corresponding electrical signal in millivolts is plotted on the ordinate.

FIG. 7 shows a diagram on which the distance d in millimeters according to FIG. 6 is plotted on the abscissa and a corresponding electrical signal in millivolts is plotted on the ordinate of the diagram shown in FIG. 7. A first characteristic curve 700 shows in this case the relationship between a distance change and an electrical signal resulting therefrom, if the spring 250 is manufactured from steel. Similarly, a second characteristic curve 710 shows the relationship between the distanced and a resulting electrical signal if the spring 250 is manufactured from another steel material. A third characteristic curve 720 shows the relationship between the distance d and the resulting electrical signal of a sensor element 222 if the spring is produced from copper, whereas a fourth characteristic curve 730 shows the relationship between the distance d and a resulting electrical signal of the sensor element 222 if the spring 250 is produced from aluminum.

The advantage of such a force sensor system can be considered to be, inter alia, that it is a contactless sensor system. Therefore, no annoying noises occur, since signal generator and signal receiver are (mechanically) decoupled. Moreover, such a force sensor system is producible cost-effectively, since sensor damping and a spring function can be implemented in one component. In addition, a very high measurement accuracy may also be implemented, whereby this approach to a force sensor system is ideal for registering relatively small movements of 0.1 mm to 0.3 mm. Using two, but in particular three or more sensor elements (inductive coils here, for example) in the corner regions of the operating surface element 140 or the printed circuit board 210 connected to this operating surface element 140, the position of a pressure of the finger on the operating surface element 140 can be determined very precisely and can be compared, for example, to the results of the touch sensor system. The position of the pressure of the finger on the operating surface element 140 can be produced, for example, by a triangulation in which the distances of the sensor elements 222 in relation to one another known from the individual sensor elements 222 from FIG. 2 or FIG. 6 are related to one another, so that then the position of the pressure of the finger on the surface element 140 can be determined. If a movement path of the finger over the operating surface element 140 is now registered, for example by a change over time of the position at which the pressure of the finger is applied to the operating surface element 140, the swipe gesture can then be determined in the swipe gesture determination device 160 from this knowledge or from the time curve of the finger movement, which can then be used for the reliable activation of vehicle functions. A high level of functional reliability may be achieved in this way.

As already mentioned, the spring rate of the spring elements or the spring wings 255 here is dependent on the maximum force trigger threshold which is to be reached, for example, after a maximum pressing movement of 0.1 to 0.3 mm. This can certainly be at higher forces (for example 100 N/mm). This would have the result that the power of the actuator 225 would accordingly also have to be high and therefore the structural size and also the costs would increase. Such a disadvantage can be prevented by a suitable design and integration of the spring 250 (formed here as a leaf spring) in the overall system of the vehicle component 130, as explained in more detail in the following description.

Figure 8:
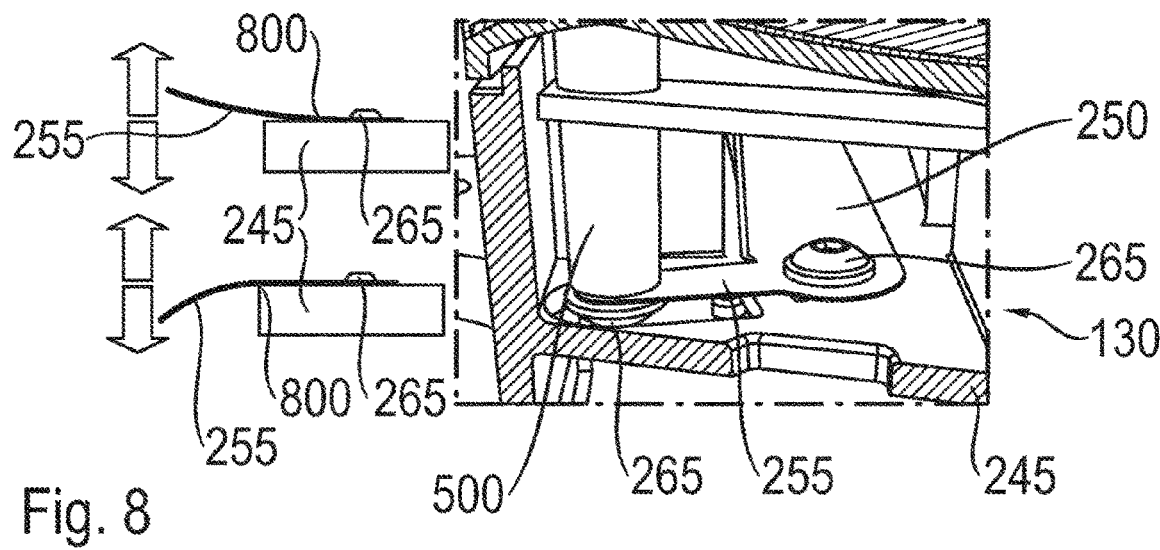
FIG. 8 shows partial illustrations of the implementation of a differing spring force in different movement directions of the spring.

FIG. 8 shows partial illustrations of the implementation of a differing spring force in different movement directions of the spring 250, which can be used to implement the concept of the force threshold determination indicated above. In this case, the right partial figure of FIG. 8 shows a detail of the vehicle component 130 from a different viewing angle than FIG. 5, wherein the fastening of the spring 250 via the spring wings 255 and the fastening screws 265 is again shown. It can be seen in the lower illustration in the left partial figure from FIG. 8 how a very short length of the spring wing 255 is available for a deflection during a movement downward of the web 500, and a high spring stiffness of the spring wing 255 results in this way. This short length of the spring wing 255 is set by a buckling edge 800, which sets a length of the spring wing 255 between one end of the housing element 245 and the fastening screw 265. In contrast, if a movement of the web 500 is executed upward, as is shown in the upper illustration of the left partial figure of FIG. 8, this buckling edge 800 is located directly at the fastening screw 265, so that a significantly greater length of the movable spring wing 255 results here, which then forms a lower spring constant of the spring wing 255.

By means of the buckling edge 800 in the pressing direction of the spring force, for example, the lever of the spring element or the spring wing 255 is thus reduced and therefore the spring rate is increased. In the opposite direction of the finger force (which corresponds here to the action direction of the actuator), the spring rate is significantly lower and the power of the actuator 225 can thus also be accordingly designed to be lower. The haptic feedback is specified and tested here on the basis of the repetition accuracy in the non-actuated state. In the haptic feedback, a differentiation is made between the following haptic feedback options according to one exemplary embodiment depending on the touch function:

Touch button: two pulse haptics depending on exceeding and falling below the push and release force threshold "touch button"; and Touch slider: when a defined touch gesture (for example defined swipe gesture length) was executed correctly and during this the finger force was greater than a push force threshold.

In addition, active damping can also be implemented using suitable activation of the vibration coil to minimize reverberation of the system.

The haptic feedback output may be implemented differently according to one exemplary embodiment. For example, after exceeding a defined force trigger threshold, haptic feedback can take place from the system by means of the coil 230 designed as a vibration coil, which is positioned as centrally as possible below the operating surface element 140, for example. Alternatively, multiple vibration coils with lower power would also be possible, which is not shown in more detail in FIG. 2, however. The coil carrier having a winding as the coil 230 (which can be fixed using the fastening dome 235 on the surface element 140 and is enclosed using the jacket 240) is fastened (for example screwed) onto the operating surface. The jacket 240 including permanent magnet is fastened corresponding to the position of the coil 230 in the housing element 245 located underneath. This mechanical structure is similar to that of a loudspeaker. The operating surface element 140 would be the membrane in this case. Upon the activation of the vibration coil 230, the operating surface element 140 is excited in the Z direction (thus upward in FIG. 2).

Figure 9:
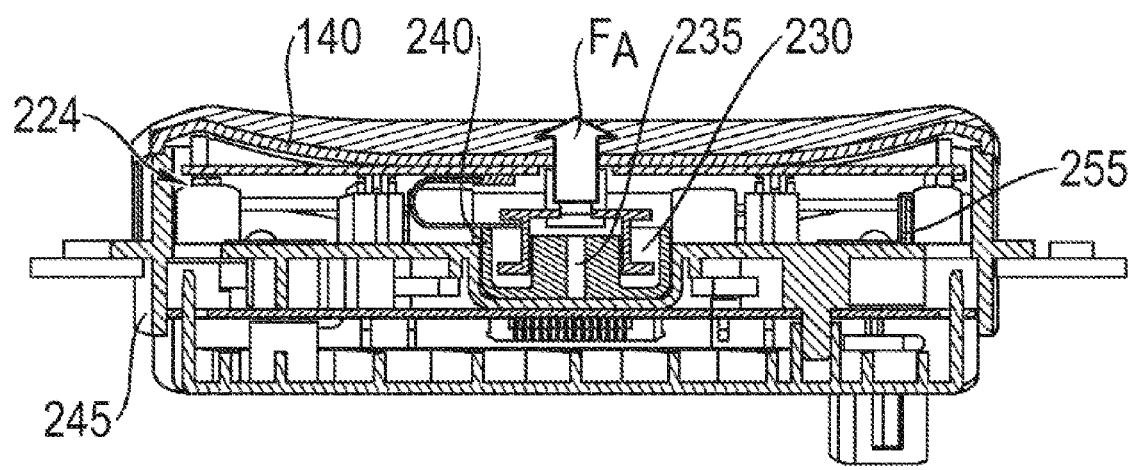
FIG. 9 shows a cross-sectional illustration of a vehicle component in the assembled state.

FIG. 9 shows a cross-sectional illustration of a vehicle component 130 in the assembled state, as is shown as an exploded illustration in FIG. 2. It is recognizable here that an actuator force $F_A$ can be applied by the actuator 225 to the operating surface element 140, by which the haptic feedback can be given to the finger of the user.

Before active haptic feedback, an applied finger on an operating surface element 140 is thus first detected by means of a touch-sensitive sensor system (for example, capacitive or inductive), for example, on the rear side of the operating surface element 140. The finger force applied by the operator to the operating surface element 140 is sensed by means of a force sensor system such as the distance sensor 224. If the position of the finger is located above a selectable function on the operating surface element 140 and the force applied using the finger is greater than or equal to a fixedly defined force trigger threshold, for example 3.5 N, haptic feedback takes place via the operating surface element to the user.

To enable particularly good perceptibility of the haptic feedback for the user, according to one exemplary embodiment, as a property of the feedback, the feedback system can be designed to generate a pulse and thus a vibration on the operating surface element 140. The vibration on the surface is, for example, in the frequency range from 50 to 300 Hz, since in this range the Pacini receptors in the finger react most sensitively to pressure stimulation. Furthermore, the vibration on the surface has a maximum amplitude of 0.15 mm and a damping of approximately 5% of the maximum amplitude after 3 cycles. The acceleration to the first vibration peak (vibration maximum) corresponds to at most approximately 6G.

With suitable excitation of the operating surface element 140, haptic feedback can thus be generated according to the above-mentioned description. The power of the actuator is dependent on multiple factors, for example a weight of the mass to be excited, a required dynamic response for generating the haptic pulse, and the restoring force to be overcome of the spring rate/spring constant of the spring wing 255. The problem of a possible incorrect operation of the vehicle component can be avoided or at least reduced, for example, by means of an active haptic system (in which feedback takes place according to defined force trigger threshold).

FIG. 10 shows a perspective illustration of different steps or method stages of the production or assembly of a vehicle component 130, as was described in more detail above, in multiple partial figures.

Figure 10A:
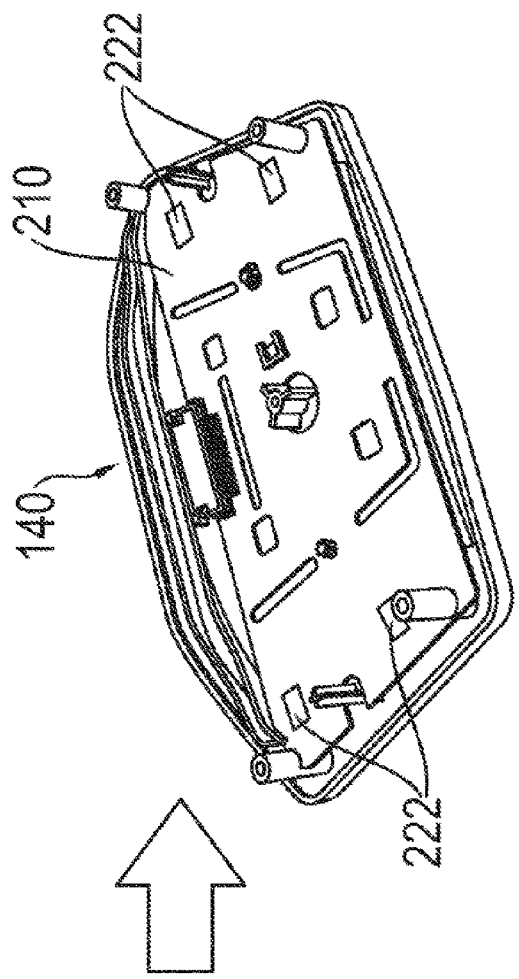
FIGS. 10A to 10K show a perspective illustration of different steps or method stages of the production or assembly of a vehicle component in multiple partial FIGS., as was described above in more detail.
Figure 10A:
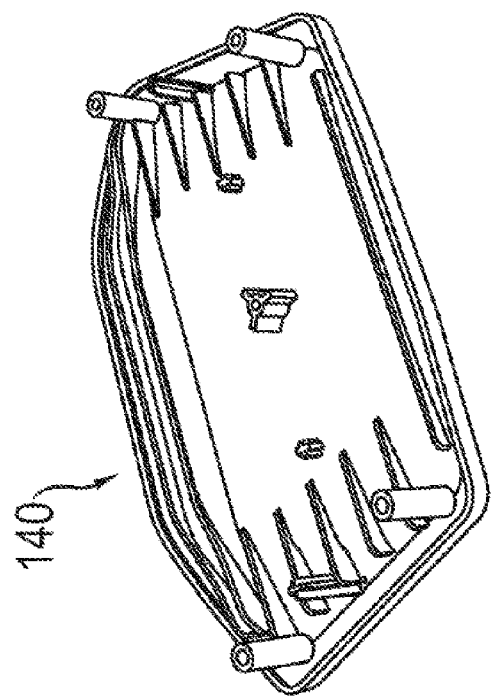

First, a first partial FIG. 10A shows how an operating surface element 140 is connected, for example laminated, on its rear side to the printed circuit board 210. Furthermore, sensor elements 222 are recognizable here, which are formed as planar coils, for example, in the printed circuit board 210 and are thus very simple to produce.

Figure 10B:
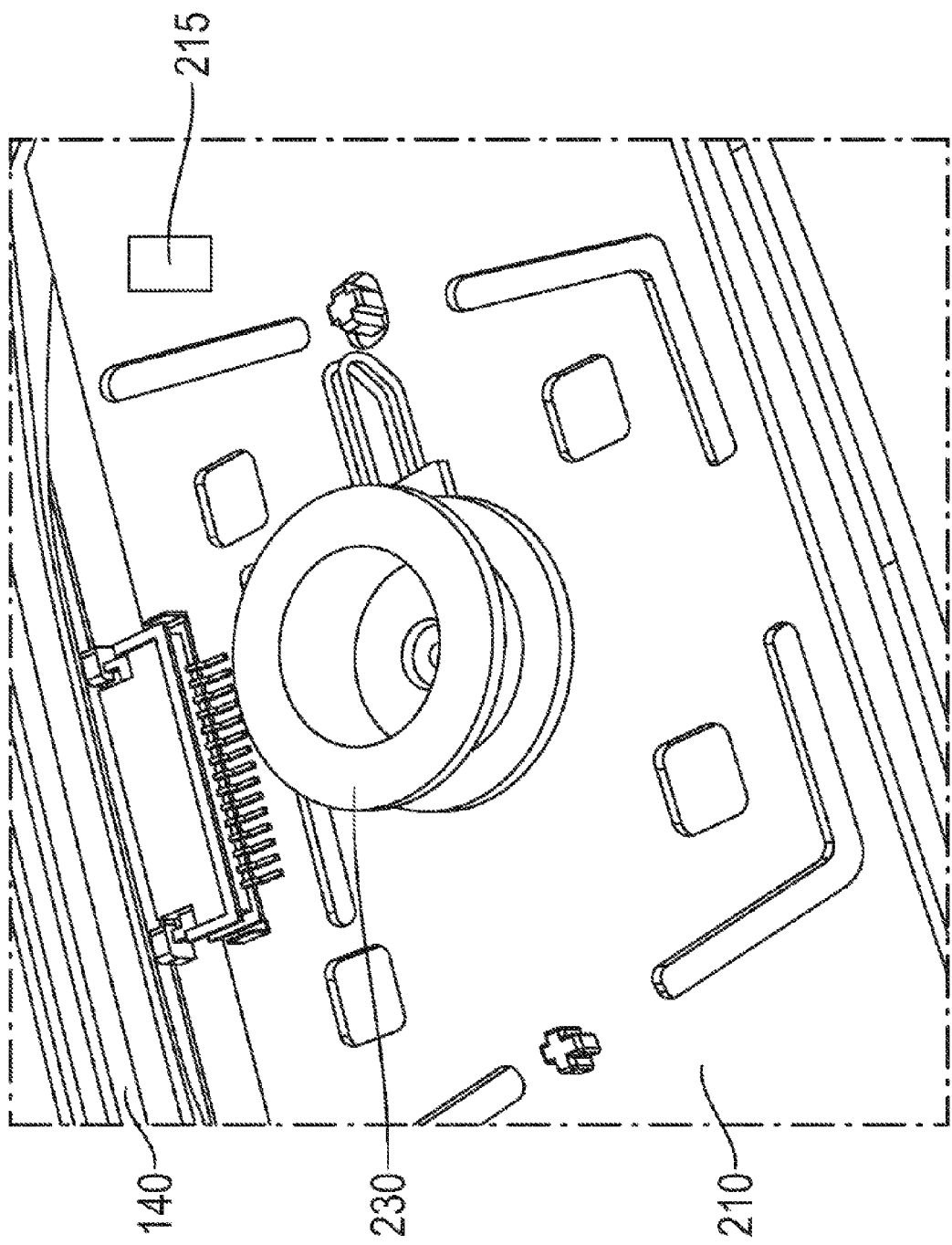

In a production step subsequent thereto, which is shown in the second partial FIG. 10B, the coil body 230 is placed on a corresponding centering point.

Figure 10C:
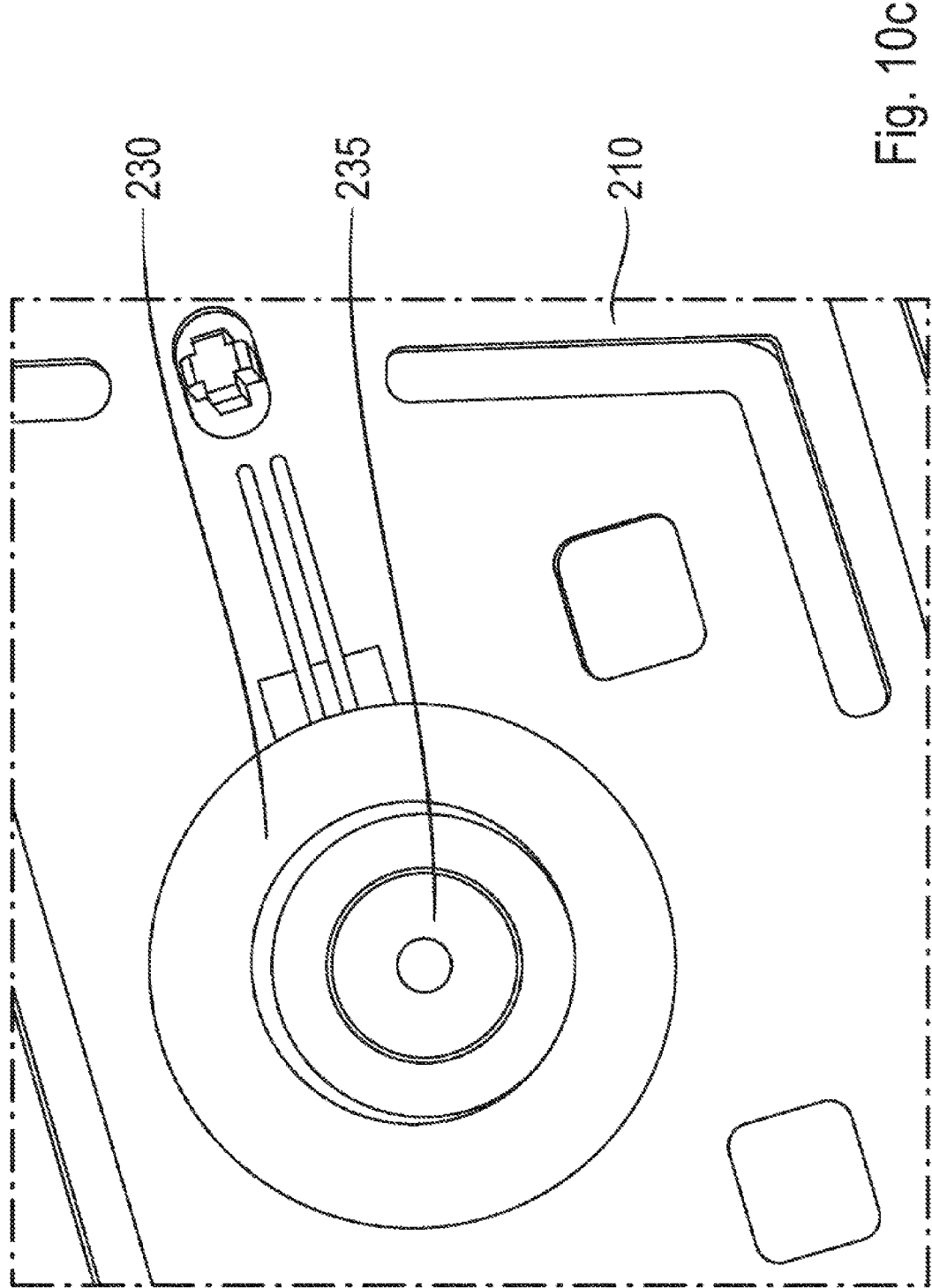

Partial FIG. 10C shows a perspective view, in which the coil body 230 has now been fixed by means of the fastening dome 235 and a coil attached or inserted on the coil body 230 is connected electrically conductively to corresponding components.

Figure 10D:
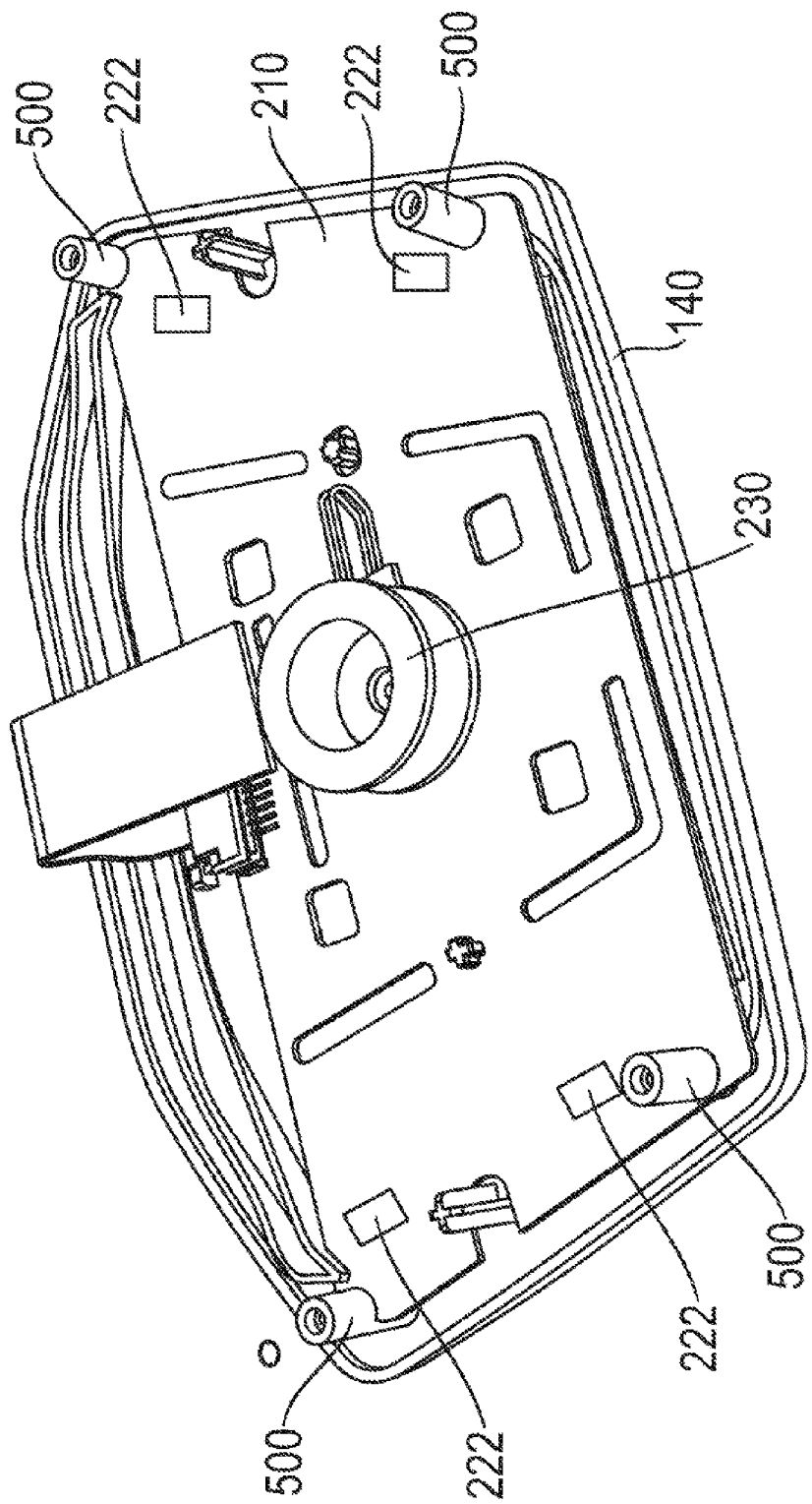

Partial FIG. 10D shows the perspective overall view of the operating surface element 140 including printed circuit board 210 fastened thereon and coil 230, as was produced according to the preceding method steps.

Figure 10E:
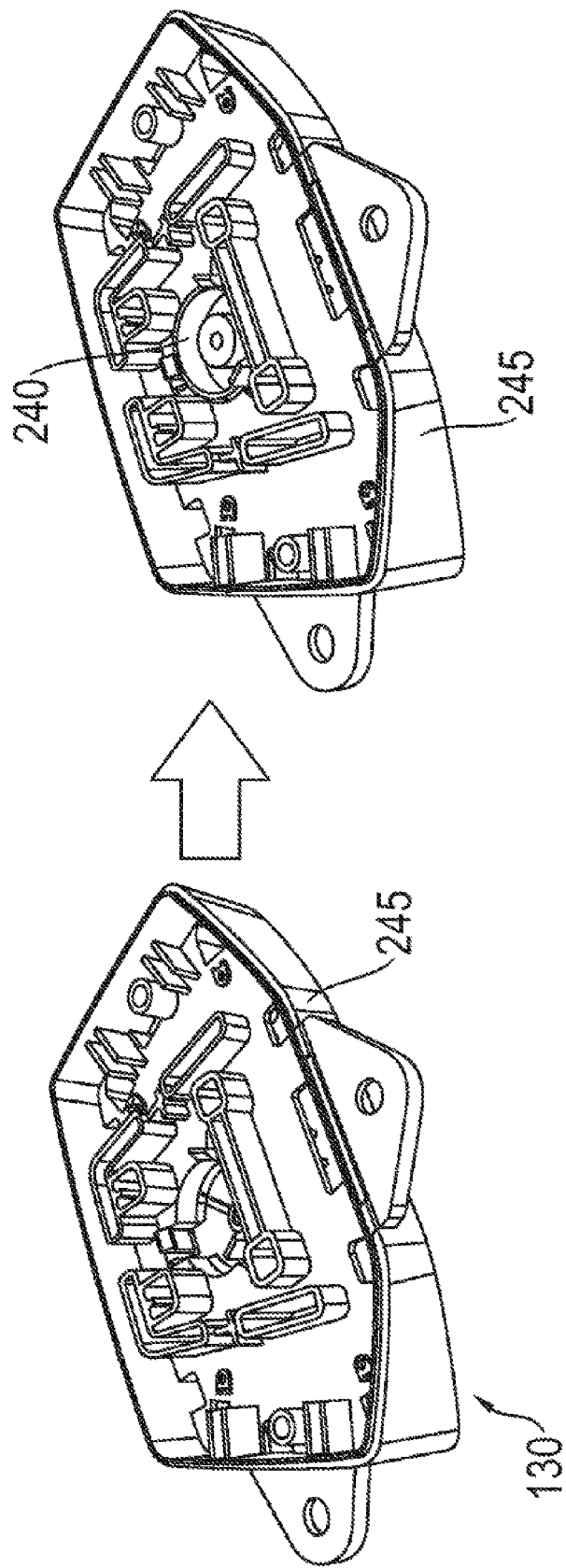

In partial FIG. 10E, a perspective view of a method stage of the vehicle component 130 is now shown, in which, in a further production step, the coil jacket 240 is introduced, for example clipped or latched, into the housing element 245.

Figure 10F:
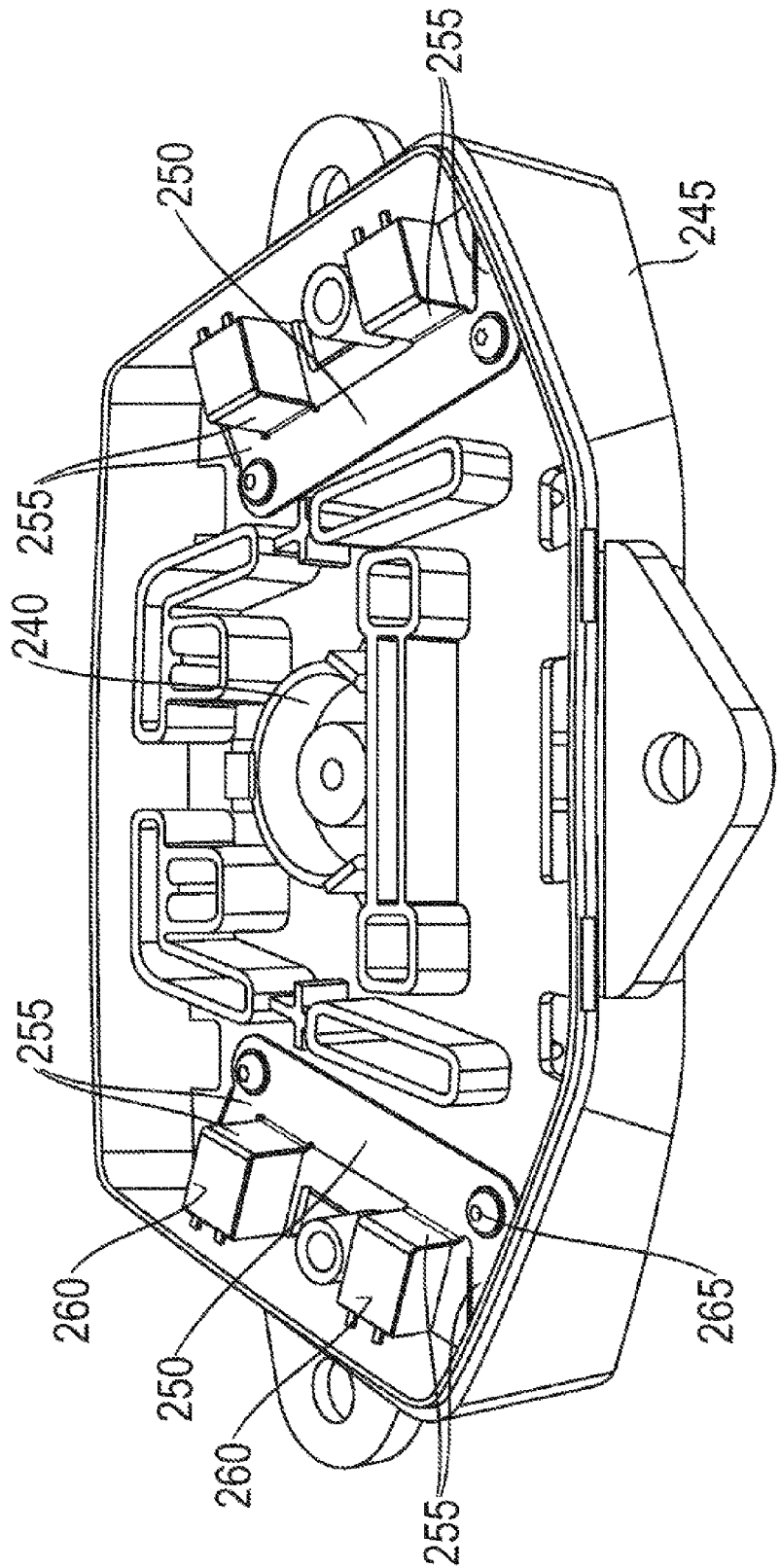

Partial FIG. 10F shows how a spring 250 is installed by means of four fastening screws 265 in each case on two opposing sides of the housing element 245, wherein the springs have the spring wings 255 and an end face 260 is provided at one end of two of the spring wings 255, which is used as a measurement element for a sensor element arranged above it.

Figure 10G:
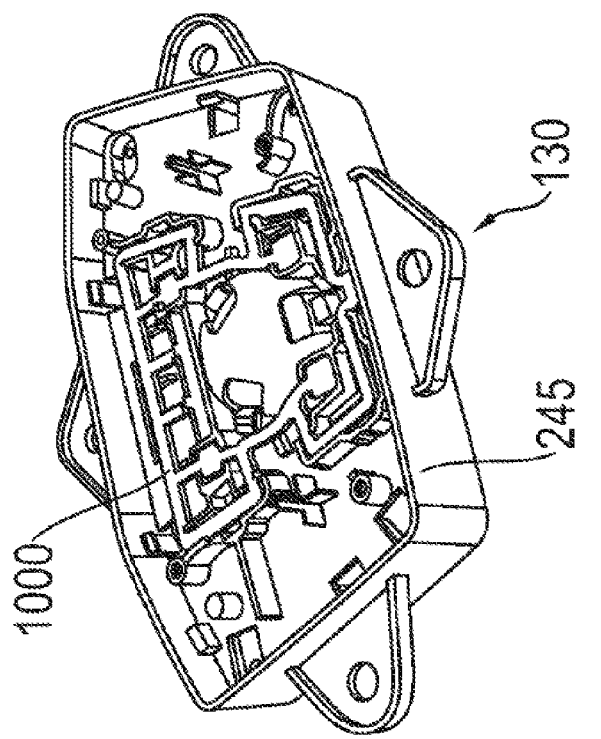
Figure 10G:
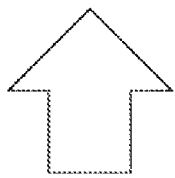
Figure 10G:
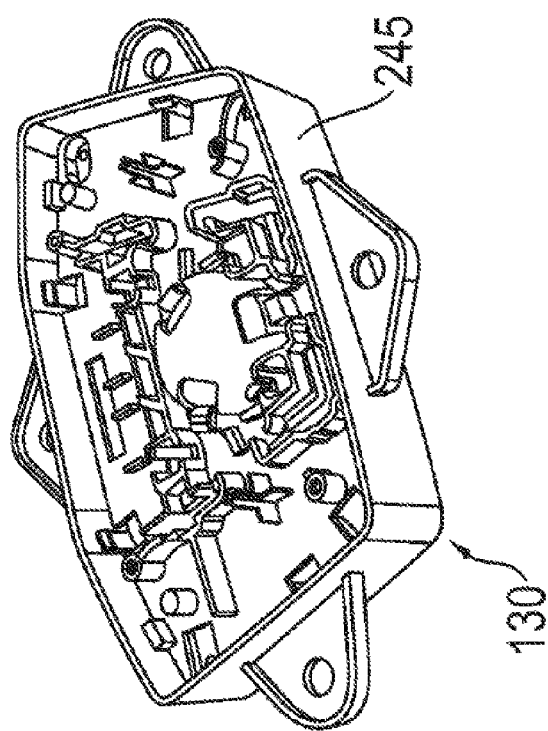

Partial FIG. 10G shows a perspective illustration of how a light guide 1000 is joined and/or fixed in the housing element 1245, for example to be able to implement very fast data transfer inside the vehicle component 130.

Figure 10H:
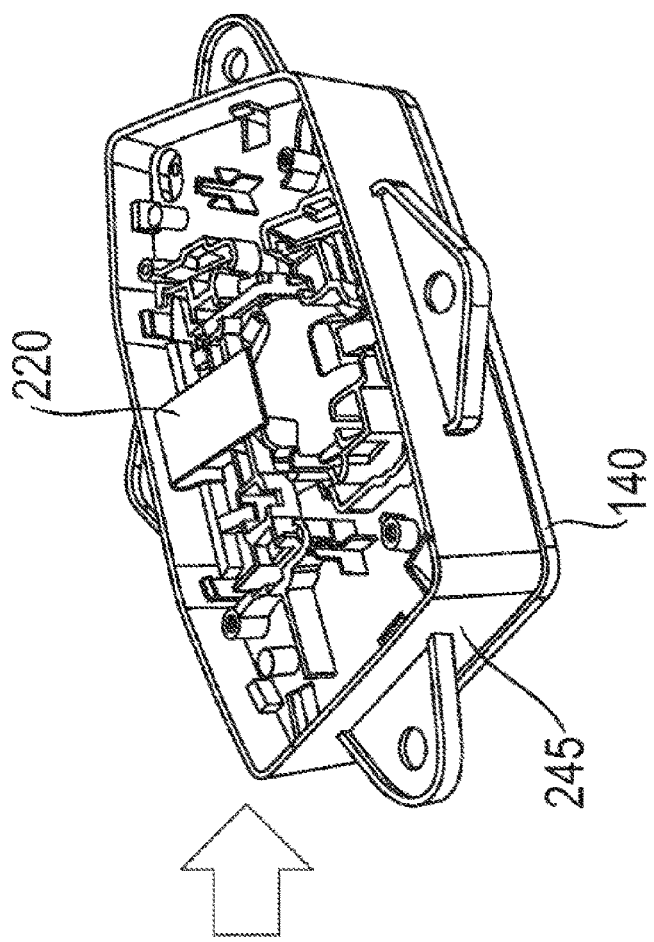
Figure 10H:
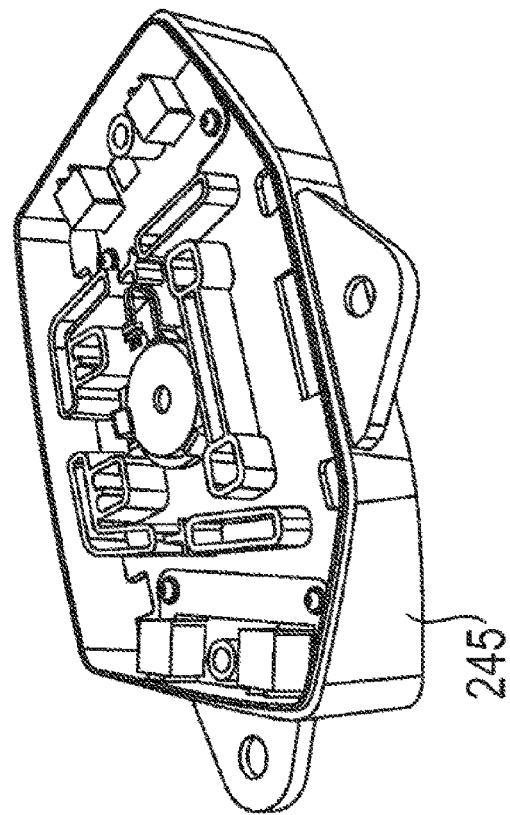

Partial FIG. 10H now shows in a perspective view how the prepared operating surface element 140 is joined and aligned on the housing element 245 prepared in this way and a line 220 is joined through a housing passage in the housing element 245.

Figure 10I:
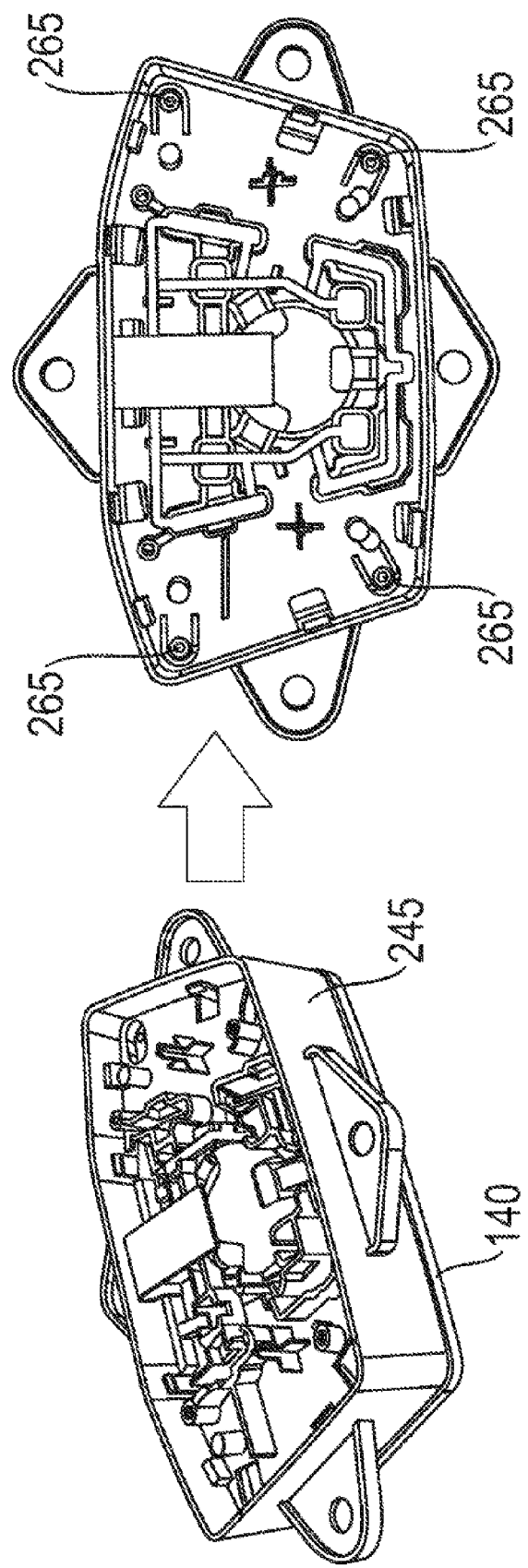

Partial FIG. 10I shows in a perspective view how a screw connection of the operating surface element 140 on the housing element 245 is performed by means of the fastening screws 265, wherein these fastening screws 265 are screwed, for example, into the web 500 shown in FIG. 5 or 8.

Figure 10J:
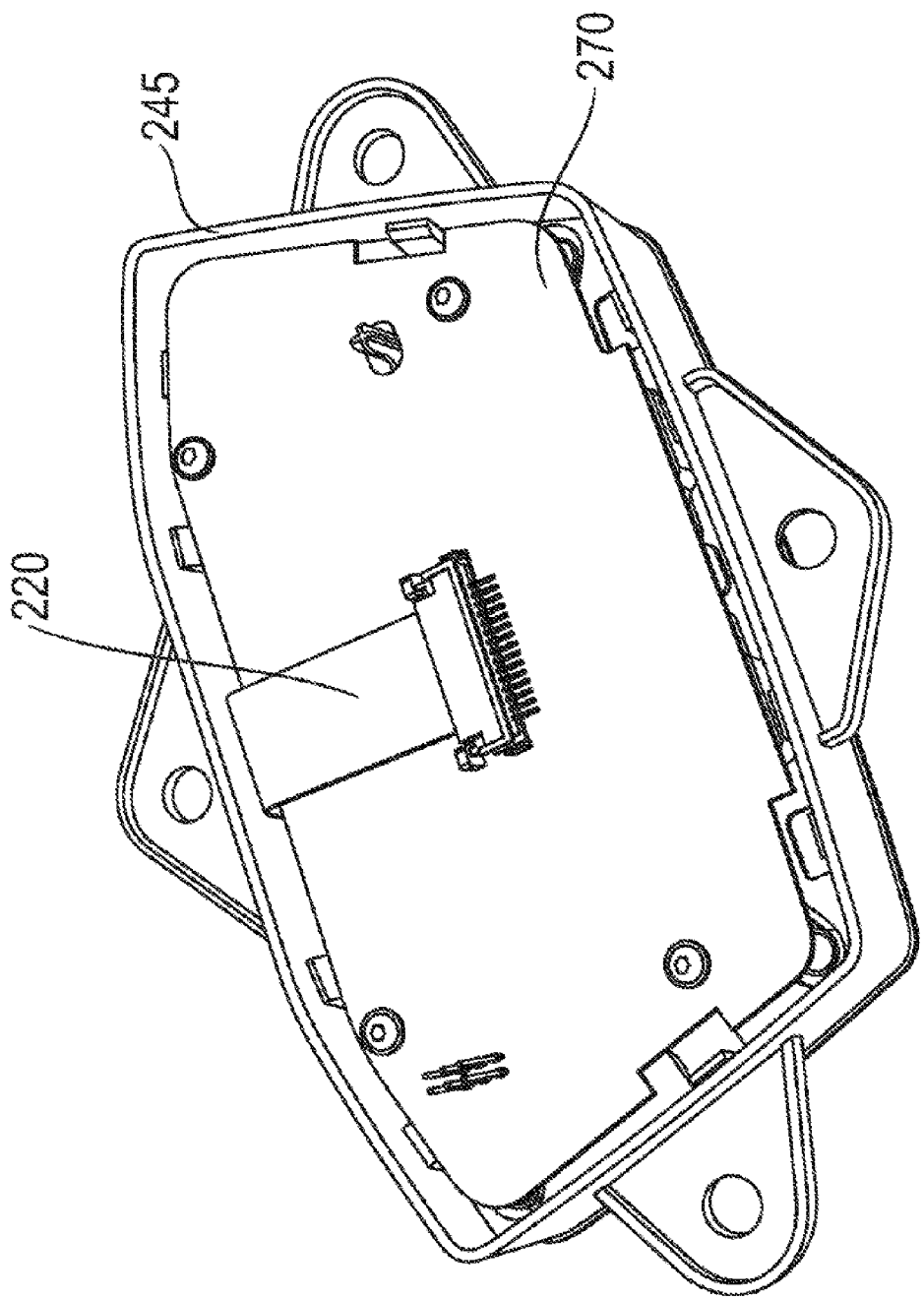

Partial FIG. 10J shows a perspective view of an installation of the main printed circuit board 270 on the housing element 245 and the contacting of the printed circuit board 210 by means of line/cable 220

Figure 10K:
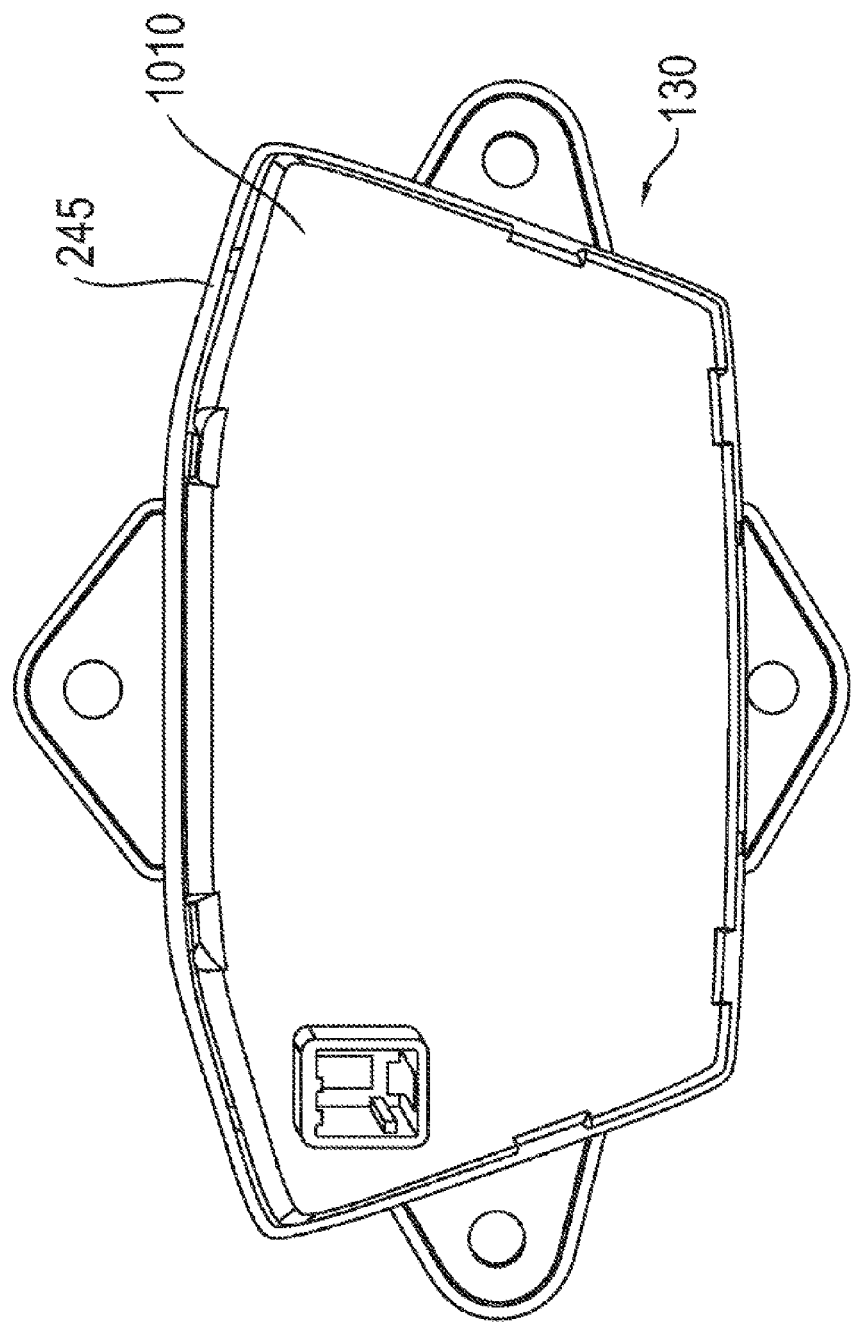

Finally, partial FIG. 10K also shows how a cover 1010 is fastened on the housing element 145, so that now the vehicle component can be protected efficiently and securely from environmental influences, for example sprayed water and dust.

Figure 11:
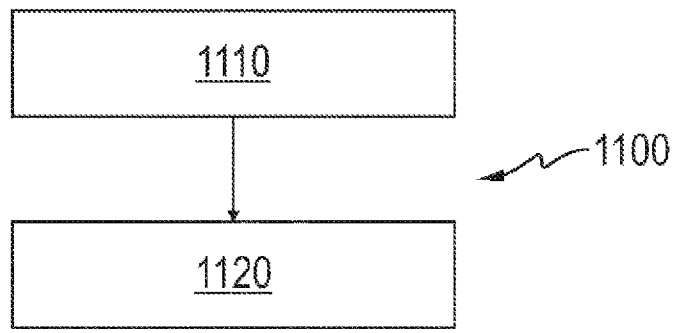
FIG. 11 shows a flow chart of an exemplary embodiment as a method for determining a swipe gesture performed on a moving surface element of a vehicle component.

FIG. 11 shows a flow chart of an exemplary embodiment as method 1100 for determining a swipe gesture performed on a moving surface element of a vehicle component using a swipe gesture detection device according to a variant presented here. The method 1100 comprises a step 1110 of reading one distance per sensor element between the surface element and the housing element and a step 1120 of determining the swipe gesture performed on the surface element using a parameter of the spring and the distances registered by the sensor elements between the surface element and the housing element.

Figure 12:
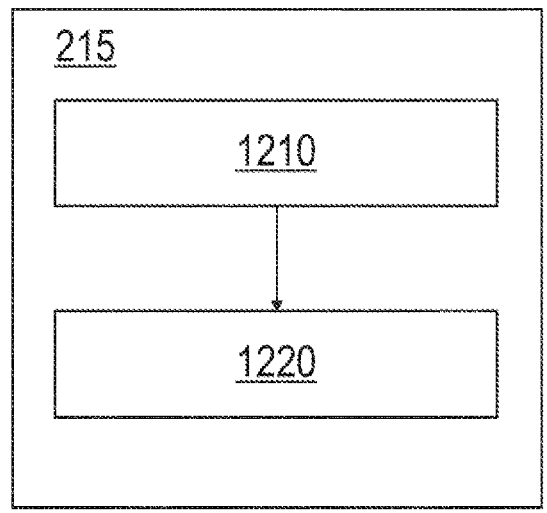
FIG. 12 shows a block diagram of an evaluation unit for determining a swipe gesture performed on a moving surface element of a vehicle component.

FIG. 12 shows a block diagram of an evaluation unit 215 for determining a swipe gesture performed on a moving surface element of a vehicle component using a swipe gesture detection device according to a variant presented here. The evaluation unit comprises a reading interface 1210 for reading one distance per sensor element between the surface element and the housing element. Furthermore, the evaluation unit 215 comprises a unit 1220 for determining the swipe gesture performed on the surface element using a parameter of the spring and the distances registered by the sensor elements between the surface element and the housing element.

The described exemplary embodiments shown in the figures are only selected as examples. Different exemplary embodiments can be combined with one another completely or in reference to individual features. One exemplary embodiment can also be supplemented by features of a further exemplary embodiment.

Furthermore, method steps according to the invention can be executed repeatedly and in a sequence other than that described.

If an exemplary embodiment comprises an "and/or" linkage between a first feature and a second feature, this can be read to mean that the exemplary embodiment includes both the first feature and also the second feature according to one embodiment and includes either only the first feature or only the second feature according to a further embodiment.

LIST OF REFERENCE NUMERALS 100 vehicle
110 motor
120 transmission
125 wheels
130 vehicle component
135 vehicle occupant
140 operating surface element, surface element
142 activation signal
150 infotainment system
160 force measuring device
200 contour
210 printed circuit board
215 evaluation unit
220 cable
222 sensor elements
224 distance sensor
225 actuator
230 coil
240 jacket
245 housing element
250 spring
255 spring wings
260 end faces
265 fastening screws
270 main printed circuit board
500 web
F finger force
d distance
700 first characteristic curve 710 second characteristic curve
720 third characteristic curve
730 fourth characteristic curve
800 buckling edge
$F_A$ actuator force
1000 light guide
1010 cover
1100 method for determining a swipe gesture performed on a moving surface element of a vehicle component
1110 step of reading
1120 step of determining
1210 reading interface
1220 unit for determining

The invention claimed is:

1. A swipe gesture detection device for determining a swipe gesture performed on a moving surface element of a vehicle component, the swipe gesture detection device comprising:
   a spring, wherein the spring applies a pre-tension between the moving surface element and a housing element of the vehicle component;
   a distance sensor configured for measuring in a contactless manner, the distance sensor having at least three sensor elements arranged at different positions for registering a distance (d) between the surface element and the housing element at the positions of each of the sensor elements; and
   an evaluation unit configured to determine the swipe gesture performed on the surface element based on a parameter of the spring and the distances (d) registered by the sensor elements between the surface element and the housing element.

2. The swipe gesture detection device as claimed in claim 1, wherein the evaluation unit is configured to detect a path of a finger over the surface element as a swipe gesture, wherein the evaluation unit uses the distances (d) registered by the sensor elements, which are recorded at different points in time, to determine a movement trajectory of a pressure of the finger on the surface element and/or wherein the swipe gesture is recognized as such if the path and/or the movement trajectory is longer than a predefined minimum path and/or to detect the swipe gesture if the finger was pressed with a force on the surface element which is greater than a minimum force, in particular wherein this minimum force is 3 to 10 N or wherein this minimum force is formed in such a way that, under an action of the spring at the affected sensor element, the distance (d) between the surface element and the housing element is reduced by 0.1 to 0.3 mm.

3. The swipe gesture detection device as claimed in claim 1, wherein the spring is formed as a leaf spring and/or at least has multiple spring wings on different sides of the spring, and wherein the spring is connected to the housing element and/or the surface element of the vehicle component.

4. The swipe gesture detection device as claimed in claim 1, wherein the distance sensor includes a capacitively and/or inductively measuring sensor wherein such that the sensor elements are configured to measure the distance (d) between the surface element and the housing element capacitively and/or inductively at the positions of the sensor elements.

5. The swipe gesture detection device as claimed in claim 1, wherein the spring is at least partially formed and/or fastened on the housing element in such a way that it has a differing spring stiffness, in opposite movement directions, and/or wherein the spring is at least partially formed as a measurement encoder of the distance sensor.

6. The swipe gesture detection device as claimed in claim 1, wherein the spring at least partially includes a metallic material, in particular includes copper, aluminum, and/or steel.

7. The swipe gesture detection device as claimed in claim 1, further comprising an actuator that is mechanically coupled to the surface element and is designed to configured to actively move the surface element when the swipe gesture has been detected.

8. The swipe gesture detection device as claimed in claim 7, wherein the actuator is configured to move the surface element at a frequency of 50 to 30 Hz and/or an amplitude or deflection of at most 0.15 mm and/or a damping of a vibration of 5% of a maximum amplitude after 3 cycles and/or an acceleration to the first vibration maximum of 6G.

9. The swipe gesture detection device as claimed in claim 7, wherein the actuator has at least one coil, which is in particular arranged centrally in relation between the surface element and the housing element.

10. The swipe gesture detection device as claimed in claim 1, wherein the surface element at least partially has a relief-shaped contour.

11. A method (1100) for determining a swipe gesture performed on a moving surface element of a vehicle component using a swipe gesture detection device as claimed in claim 1, wherein the method (1100) has the following steps:
    reading (1010) one distance (d) per sensor element between the surface element and the housing element; and
    determining (1020) the swipe gesture performed on the surface element using a parameter of the spring and the distances registered by the sensor elements between the surface element and the housing element.

12. An evaluation unit, which is configured to execute and/or activate the steps of the method as claimed in claim 11.

* * * * *